US012695663B2

(12) United States Patent
Zhou et al.

(10) Patent No.: US 12,695,663 B2
(45) Date of Patent: Jul. 28, 2026

(54) INFORMATION PROCESSING METHOD AND APPARATUS, DEVICE, AND STORAGE MEDIUM

(71) Applicant: ZTE CORPORATION, Shenzhen (CN)

(72) Inventors: Yingjun Zhou, Shenzhen (CN); Yin Gao, Shenzhen (CN); Dapeng Li, Shenzhen (CN); Zhuang Liu, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 349 days.

(21) Appl. No.: 18/547,765

(22) PCT Filed: Feb. 21, 2022

(86) PCT No.: PCT/CN2022/077007
§ 371 (c)(1),
(2) Date: Aug. 24, 2023

(87) PCT Pub. No.: WO2022/188611
PCT Pub. Date: Sep. 15, 2022

(65) Prior Publication Data
US 2024/0305521 A1 Sep. 12, 2024

(30) Foreign Application Priority Data
Mar. 12, 2021 (CN) .......................... 202110272412.0

(51) Int. Cl.
*H04L 41/0803* (2022.01)
*H04W 24/08* (2009.01)

(52) U.S. Cl.
CPC ......... *H04L 41/0803* (2013.01); *H04W 24/08* (2013.01)

(58) Field of Classification Search
CPC .... H04L 41/0803; H04W 24/08; H04W 4/00; G06F 16/27
See application file for complete search history.

(56) References Cited

U.S. PATENT DOCUMENTS

2019/0379664 A1 12/2019 Suthar et al.
2020/0029250 A1* 1/2020 Ibek .................... H04L 41/0894
2020/0304995 A1 9/2020 White et al.

FOREIGN PATENT DOCUMENTS

CN 110519085 A 11/2019
CN 110535627 A 12/2019
(Continued)

OTHER PUBLICATIONS

International Search Report in Application No. PCT/CN2022/077007, dated May 19, 2022, 6 pages, including translation.
(Continued)

*Primary Examiner* — Said M Elnoubi
(74) *Attorney, Agent, or Firm* — Morgan, Lewis & Bockius LLP

(57) ABSTRACT

Provided are an information processing method, apparatus, and device and a storage medium. The information processing method is applied by a first communication node and includes: receiving an upload related message sent by a second communication node, where the upload-related message carries upload configuration information; and performing an upload-related operation based on the upload configuration information.

18 Claims, 10 Drawing Sheets

(56)          References Cited

FOREIGN PATENT DOCUMENTS

| | | | |
|---|---|---|---|
| CN | 111615836 | A | 9/2020 |
| CN | 111680305 | A | 9/2020 |
| CN | 111930443 | A | 11/2020 |
| CN | 111934919 | A | 11/2020 |
| CN | 112000744 | A | 11/2020 |
| CN | 112311881 | A | 2/2021 |
| CN | 112449316 | A | 3/2021 |
| WO | WO2017/167550 | A1 | 10/2017 |

OTHER PUBLICATIONS

First Office Action in Chinese Application No. 202110272412.0
dated Apr. 2, 2026, 15 pages, including translation.

* cited by examiner

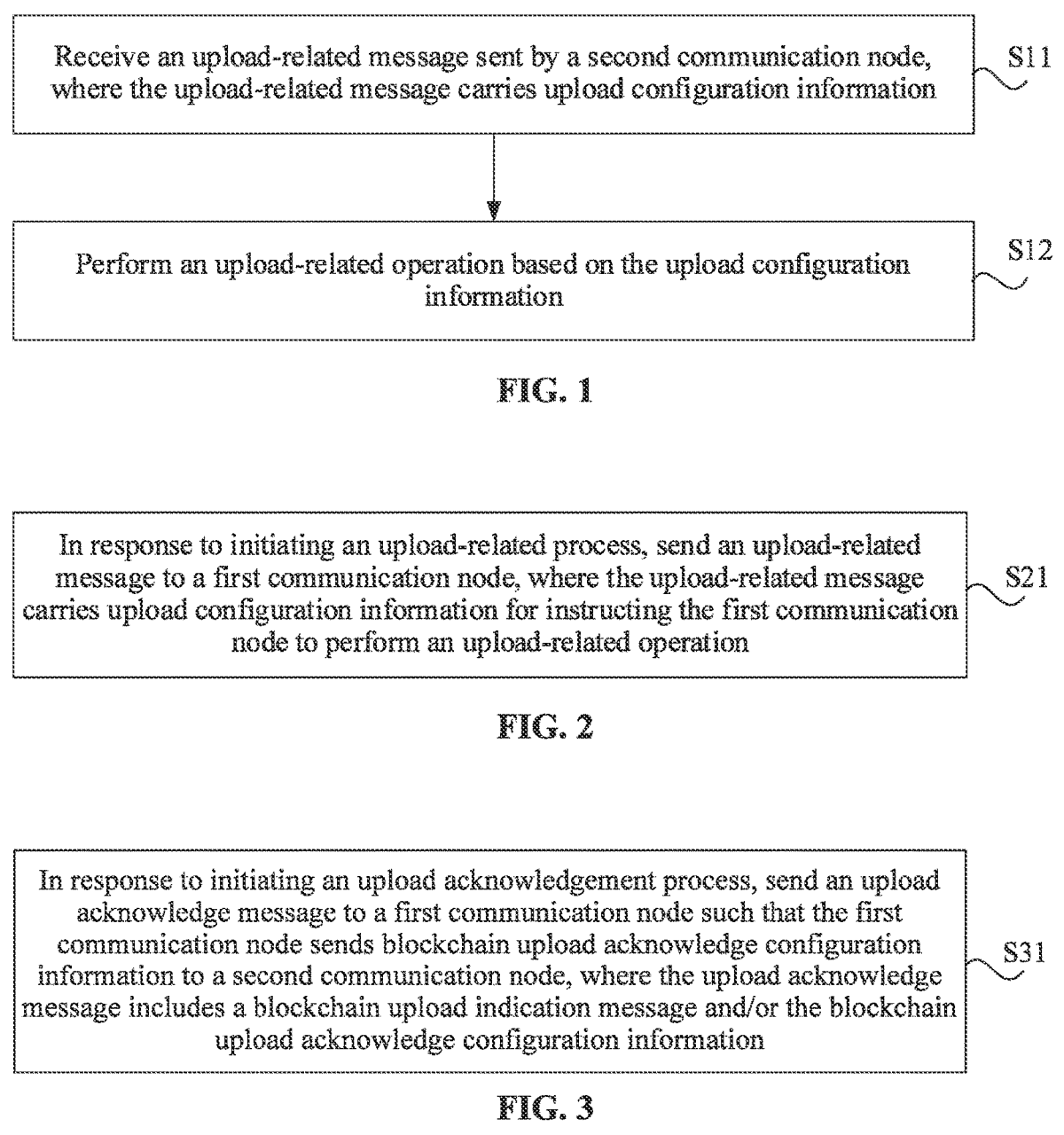

Receive an upload-related message sent by a second communication node, where the upload-related message carries upload configuration information    S11

Perform an upload-related operation based on the upload configuration information    S12

FIG. 1

In response to initiating an upload-related process, send an upload-related message to a first communication node, where the upload-related message carries upload configuration information for instructing the first communication node to perform an upload-related operation    S21

FIG. 2

In response to initiating an upload acknowledgement process, send an upload acknowledge message to a first communication node such that the first communication node sends blockchain upload acknowledge configuration information to a second communication node, where the upload acknowledge message includes a blockchain upload indication message and/or the blockchain upload acknowledge configuration information    S31

FIG. 3

INFORMATION PROCESSING METHOD AND APPARATUS, DEVICE, AND STORAGE MEDIUM

CROSS REFERENCE TO RELATED APPLICATIONS

This is a National Stage Application, filed under 35 U.S.C. 371, of International Patent Application No. PCT/CN2022/077007, filed on Feb. 21, 2022, which is based on and claims priority to Chinese Patent Application No. 202110272412.0 filed with the China National Intellectual Property Administration (CNIPA) on Mar. 12, 2021, the disclosure of which is incorporated herein by reference in its entirety.

TECHNICAL FIELD

The present application relates to the field of communication technology, for example, an information processing method, apparatus, and device and a storage medium.

BACKGROUND

Mainstream operators actively exploring the application of blockchains in a communication system have found that alliance chains are most suitable for the application scenarios of the operators, where two major mainstream application directions are the 5th generation mobile communication system (5G) edge computing and 5G co-construction and sharing, separately. The distributed characteristic of a blockchain tends to be consistent with an edge computing architecture, and the combination of the blockchain with edge device nodes is conducive to resource complementarity and the expansion of new services. In terms of co-construction and sharing, untrusted parties are required to participate and cooperate. Therefore, blockchain technology can be used for trusted data sharing. The application scenarios involved include roaming settlement, data sharing, resource allocation, and Operation Administration and Maintenance.

The blockchain technology is distributed ledger technology that originates from bitcoins and has many advantages such as security, transparency, and immutability. In the blockchain technology, data is stored through a block-chain structure, and data is updated and synchronized by use of a node consensus mechanism. A consensus mechanism is a core part of the blockchain technology and enables distributed nodes that do not trust each other to agree on certain information. The main process is that when a new block is added, some nodes need to keep accounts and other nodes verify the accounts; and when the accounts are verified, it indicates that a consensus is reached, thereby achieving trusted data storage. Based on this, cryptography is used to ensure that data on a chain cannot be forged or tampered with. A smart contract is a series of program codes recorded on a blockchain. The data stored on the blockchain can be operated automatically by use of the smart contract, so as to ensure that established rules are strictly enforced. Blockchains may be divided into three categories, including public chains, alliance chains, and private chains. All users can participant in a public chain, and any user can read and write data, conduct a transaction, and confirm a consensus. Only members within an alliance are allowed to participate in an alliance chain, member organizations run one or more nodes, and the rights for data read/write and transactions are executed according to the rules of the alliance. In contrast, only one organization has the write rights for a private chain generally used inside an enterprise.

How to effectively exchange blockchain upload configuration information between a network management system, a core network, and a base station so as to achieve trusted information storage is an urgent problem to be solved.

SUMMARY

The present application provides an information processing method, apparatus, and device and a storage medium, so as to exchange blockchain upload configuration information between a network management system, a core network, and a base station in a communication system and achieve trusted information storage.

An embodiment of the present application provides an information processing method. The method is applied by a first communication node and includes the following.

An upload-related message sent by a second communication node is received, where the upload-related message carries upload configuration information. An upload-related operation is performed based on the upload configuration information.

An embodiment of the present application provides an information processing method. The method is applied by a second communication node and includes the following.

In response to initiating an upload-related process, an upload-related message is sent to a first communication node, where the upload-related message carries upload configuration information for instructing the first communication node to perform an upload-related operation.

An embodiment of the present application provides an information processing method. The method is applied by a fourth communication node and includes the following.

In response to initiating an upload acknowledgement process, an upload acknowledge message is sent to a first communication node such that the first communication node sends blockchain upload acknowledge configuration information to a second communication node, where the upload acknowledge message includes a blockchain upload success indication message and/or the blockchain upload acknowledge configuration information.

An embodiment of the present application provides an information processing apparatus. The apparatus is configured in a first communication node and includes a receiving module and an execution module.

The receiving module is configured to receive an upload-related message sent by a second communication node, where the upload-related message carries upload configuration information. The execution module is configured to perform an upload-related operation based on the upload configuration information.

An embodiment of the present application provides an information processing apparatus. The apparatus is configured in a second communication node and includes a first sending module.

The first sending module is configured to, in response to initiating an upload-related process, send an upload-related message to a first communication node, where the upload-related message carries upload configuration information for instructing the first communication node to perform an upload-related operation.

An embodiment of the present application provides an information processing apparatus. The apparatus is configured in a fourth communication node and includes a second sending module.

The second sending module is configured to, in response to initiating an upload acknowledgement process, send an upload acknowledge message to a first communication node such that the first communication node sends blockchain upload acknowledge configuration information to a second communication node, where the upload acknowledge message includes a blockchain upload success indication message and/or the blockchain upload acknowledge configuration information.

An embodiment of the present application provides an information processing device including one or more processors and a memory.

The memory is configured to store one or more programs. The one or more programs, when executed by the one or more processors, cause the one or more processors to perform the information processing method provided in any embodiment of the present application.

An embodiment of the present application provides a storage medium, which is configured to store a computer program. The computer program, when executed by a processor, causes the processor to perform the information processing method provided in any embodiment of the present application.

BRIEF DESCRIPTION OF DRAWINGS

FIG. 1 is a flowchart of an information processing method according to an embodiment of the present application;

FIG. 2 is a flowchart of an information processing method according to an embodiment of the present application;

FIG. 3 is a flowchart of an information processing method according to an embodiment of the present application;

DETAILED DESCRIPTION

Figure 4:
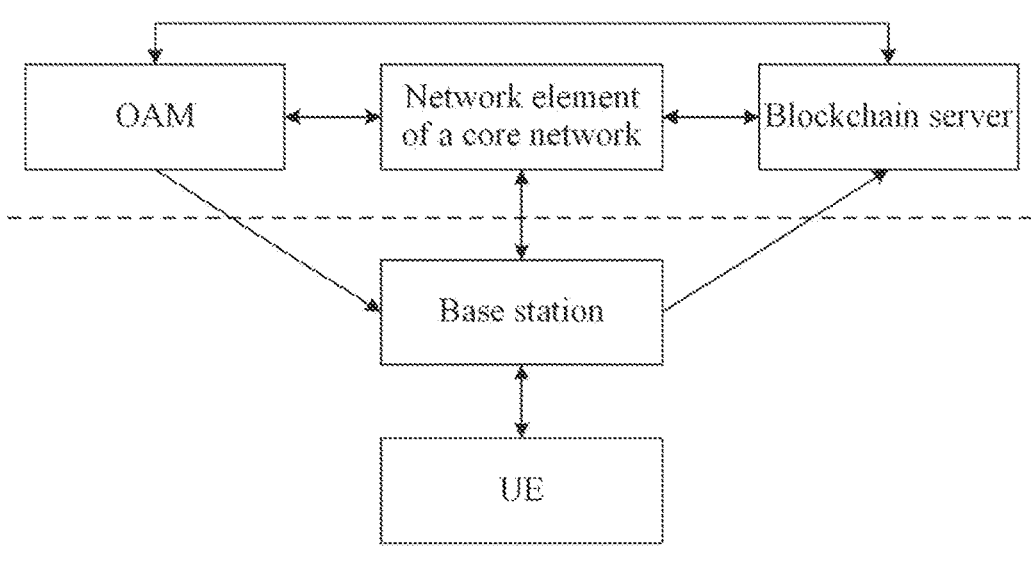
FIG. 4 is a structural diagram of a communication system according to an embodiment of the present application.

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

To solve the preceding problem, embodiments of the present application provide an information processing method, apparatus, and device and a storage medium, so as to exchange blockchain upload configuration information between a network management system, a core network, and a base station in a communication system and achieve trusted information storage.

In one embodiment, an embodiment of the present application provides an information processing method. The method may be performed by an information processing apparatus which may be implemented by software and/or hardware. The information processing method is applied by a first communication node.

As shown in FIG. 1, the information processing method provided in the embodiment of the present application mainly includes S11 and S12.

In S11, an upload-related message sent by a second communication node is received, where the upload-related message carries upload configuration information.

In S12, an upload-related operation is performed based on the upload configuration information.

In one embodiment, receiving the upload-related message sent by the second communication node includes the following.

The upload-related message directly sent by the second communication node is received; and/or the upload-related message sent by a third communication node is received, where the upload-related message is sent by the second communication node to the third communication node.

When the second communication node initiates a blockchain upload-related process, the second communication node sends a blockchain upload-related message to the third communication node, and the third communication node carries related blockchain upload configuration information in the blockchain upload-related message sent to the first communication node.

Alternatively, when the second communication node initiates a blockchain upload-related process, the second communication node may directly send the upload-related message to the first communication node, where the upload-related message carries blockchain upload configuration information.

Both blockchain technology and directed acyclic graph (DAG) technology belong to distributed ledger technology (DLT).

In the embodiment, the DAG technology may be used in the method as an alternative of the blockchain technology. In this case, a blockchain server becomes a DAG server.

If a blockchain upload system employs the DAG technology, Internet Protocol (IP) address lists and IP address combinations of the blockchain server may correspond to DAG node combinations, respectively.

In the embodiment, when the blockchain technology is used, the first communication node may be a base station which may be a next generation NodeB (gNB); the second communication node is an Operation Administration and Maintenance (OAM) system which may also be referred to as a network management system; the third communication node is a network element of a core network, where the network element of the core network may be an access management function (AMF); and a fourth communication node is the blockchain server, and a fifth communication node is a terminal.

In the embodiment, when the DAG technology is used, the first communication node may be the base station which may be the gNB; the second communication node is the OAM system which may also be referred to as the network management system; the third communication node is the network element of the core network, where the network element of the core network may be the AMF; and the fourth communication node is the DAG server, and the fifth communication node is the terminal.

To-be-uploaded blockchain data is sent to all of IP addresses of the fourth communication node; or to-be-uploaded blockchain data is sent to part of IP addresses of the fourth communication node. Measured blockchain data, such as cell load information, may be reported to only part of the IP addresses of the blockchain server.

In the embodiment, the blockchain upload-related message sent by the third communication node to the first communication node may be implemented by one or more of the following messages: an INITIAL CONTEXT SETUP REQUEST message, a HANDOVER REQUEST message, or a TRACE START message.

Alternatively, the blockchain upload-related message sent by the third communication node to the first communication node may be implemented by a new interface message constructed between the third communication node and the first communication node.

In one embodiment, the upload configuration information includes one or more of upload activation configuration information, upload deactivation configuration information, upload suspension configuration information, or upload resumption configuration information.

In one embodiment, the upload activation configuration information includes one or more of: an IP address list and/or a node list of the blockchain server reported through a blockchain measurement; a blockchain measurement content including one or more of cell load information of each public land mobile network (PLMN) or a cell spectrum usage situation; blockchain encryption algorithm configuration information; a measurement type including an event measurement and/or a periodic measurement; reporting configuration information based on a measurement type, where the reporting configuration information includes an event threshold and/or a period interval; a data format; block size information; a blockchain session identifier; an identifier of the fifth communication node; a correspondence relationship between server device identifiers/server addresses and measurement contents/upload information; or a user signature indication.

In the embodiment, when the second communication node initiates a blockchain upload activation process, the second communication node sends a blockchain upload activate message to the third communication node, and the third communication node carries related blockchain upload activation configuration information in the blockchain upload activate message sent to the first communication node.

Alternatively, when the second communication node initiates a blockchain upload activation process, the second communication node may directly send a related upload activate message to the first communication node, where the upload activate message carries blockchain upload activation configuration information.

In one embodiment, the upload deactivation configuration information, the upload suspension configuration information, and the upload resumption configuration information each include one or more of: the blockchain session identifier or the identifier of the fifth communication node.

In one embodiment, in the case where the upload configuration information is the upload activation configuration information or the upload configuration information is the upload resumption configuration information, performing the upload-related operation based on the upload configuration information includes the following.

The to-be-uploaded blockchain data is determined based on the upload configuration information and sent to the fourth communication node.

In one embodiment, determining the to-be-uploaded blockchain data based on the upload configuration information includes the following.

The to-be-uploaded blockchain data stored locally is collected based on the upload configuration information. Additionally/alternatively, an air interface message is sent to the fifth communication node and the to-be-uploaded blockchain data sent by the fifth communication node is received, where the air interface message carries the upload configuration information for instructing the fifth communication node to measure and collect the to-be-uploaded blockchain data and send the to-be-uploaded blockchain data to the first communication node.

In the embodiment, after receiving the upload activation configuration information, the first communication node collects the to-be-uploaded blockchain data stored locally and uploads the measured blockchain data to the blockchain server.

Alternatively, the first communication node sends the upload activation configuration information to the corresponding fifth communication node through the air interface message; after receiving the upload activation configuration information, the fifth communication node measures and collects blockchain data according to the upload activation configuration information and reports the measured blockchain data to the first communication node through the air interface message; and the first communication node uploads the measured blockchain data to the blockchain server.

The fifth communication node may report the to-be-uploaded blockchain data to the first communication node through a control plane or a user plane.

In one embodiment, in the case where the upload configuration information is the upload deactivation configuration information, performing the upload-related operation based on the upload configuration information includes the following.

A blockchain upload is terminated based on the upload deactivation configuration information.

In the embodiment, when the second communication node initiates a blockchain upload deactivation process, the second communication node sends a blockchain upload deactivate message to the third communication node, and the third communication node carries related blockchain upload deactivation configuration information in the blockchain upload deactivate message sent to the first communication node.

Alternatively, when the second communication node initiates a blockchain upload deactivation process, the second communication node may directly send a related upload deactivate message to the first communication node, where the upload deactivate message carries blockchain upload deactivation configuration information.

After receiving the upload deactivation configuration information, the base station terminates the blockchain upload.

In one embodiment, in the case where the upload configuration information is the upload suspension configuration information, performing the upload-related operation based on the upload configuration information includes the following.

A blockchain upload is suspended based on the upload suspension configuration information.

In the embodiment, when the second communication node initiates a blockchain upload suspension process, the second communication node sends a blockchain upload suspend message to the third communication node, and the third communication node carries related blockchain upload suspension configuration information in the blockchain upload suspend message sent to the first communication node.

Alternatively, when the second communication node initiates a blockchain upload suspension process, the second communication node may directly send a related upload suspend message to the first communication node, where the upload suspend message carries blockchain upload suspension configuration information.

After receiving the upload suspension configuration information, the base station suspends the blockchain upload.

In one embodiment, before the upload-related message sent by the second communication node is received, the method further includes the following.

If blockchain authorization information sent by the third communication node is received, the blockchain authorization information is stored.

In one embodiment, after the upload-related operation is performed based on the upload configuration information, the method further includes the following.

An upload acknowledge message sent by the fourth communication node is received, where the upload acknowledge message includes a blockchain upload success indication message and/or blockchain upload acknowledge configuration information. The blockchain upload acknowledge configuration information is sent to the second communication node.

In one embodiment, sending the blockchain upload acknowledge configuration information to the second communication node includes the following.

The blockchain upload acknowledge configuration information is directly sent to the second communication node. Additionally/alternatively, the blockchain upload acknowledge configuration information is sent to the third communication node, where the third communication node sends the blockchain upload acknowledge configuration information to the second communication node.

In the embodiment, the fourth communication node initiates a blockchain upload acknowledgement process and sends a blockchain upload acknowledge message to the first communication node. After receiving the blockchain upload acknowledge message, the first communication node sends the blockchain upload acknowledge configuration information to the third communication node through an interface between the first communication node and the third communication node and according to an interface process. For example, a multiplexing message may be used, or a new interface message constructed between the first communication node and the third communication node may be used.

After receiving the blockchain upload acknowledge configuration information, the third communication node sends the blockchain upload acknowledge configuration information to the second communication node.

Alternatively, the fourth communication node initiates a blockchain upload acknowledgement process and sends a blockchain upload acknowledge message to the first communication node, where the blockchain upload acknowledge message includes the blockchain upload success indication message and the blockchain upload acknowledge configuration information. After receiving the blockchain upload acknowledge message, the first communication node sends the blockchain upload acknowledge configuration information to the second communication node.

In one embodiment, the blockchain upload acknowledge configuration information includes one or more of: the IP address list and/or a node list of the blockchain server reported through the blockchain measurement; the blockchain measurement content including one or more of the cell load information of each PLMN or the cell spectrum usage situation; the blockchain session identifier; or the identifier of the fifth communication node.

In one embodiment, an embodiment of the present application provides an information processing method. The method may be performed by an information processing apparatus which may be implemented by software and/or hardware. The information processing method is applied by a second communication node.

As shown in FIG. 2, the information processing method provided in the embodiment of the present application mainly includes S21.

In S21, in response to initiating an upload-related process, an upload-related message is sent to a first communication node, where the upload-related message carries upload configuration information for instructing the first communication node to perform an upload-related operation.

In one embodiment, sending the upload-related message to the first communication node includes the following.

The upload-related message is directly sent to the first communication node. Additionally/alternatively, the upload-related message is sent to a third communication node, where the third communication node sends the upload-related message to the first communication node.

In one embodiment, an embodiment of the present application provides an information processing method. The method may be performed by an information processing apparatus which may be implemented by software and/or hardware. The information processing method is applied by a fourth communication node.

As shown in FIG. 3, the information processing method provided in the embodiment of the present application mainly includes S31.

In S31, in response to initiating an upload acknowledgement process, an upload acknowledge message is sent to a first communication node such that the first communication node sends blockchain upload acknowledge configuration information to a second communication node, where the upload acknowledge message includes a blockchain upload success indication message and/or the blockchain upload acknowledge configuration information.

In one embodiment, that the first communication node sends the blockchain upload acknowledge configuration information to the second communication node includes the following.

The first communication node directly sends the blockchain upload acknowledge configuration information to the second communication node. Additionally/alternatively, the first communication node sends the blockchain upload acknowledge configuration information to a third communication node, where the third communication node sends the blockchain upload acknowledge configuration information to the second communication node.

In the embodiment, the fourth communication node initiates a blockchain upload acknowledgement process and sends a blockchain upload acknowledge message to the first communication node. After receiving the blockchain upload acknowledge message, the first communication node sends the blockchain upload acknowledge configuration information to the third communication node through an interface between the first communication node and the third communication node and according to an interface process. For example, a multiplexing message may be used, or a new interface message constructed between the first communication node and the third communication node may be used.

After receiving the blockchain upload acknowledge configuration information, the third communication node sends the blockchain upload acknowledge configuration information to the second communication node.

Alternatively, the fourth communication node initiates a blockchain upload acknowledgement process and sends a blockchain upload acknowledge message to the first communication node, where the blockchain upload acknowledge message includes the blockchain upload success indication message and the blockchain upload acknowledge configuration information. After receiving the blockchain upload acknowledge message, the first communication node sends the blockchain upload acknowledge configuration information to the second communication node.

In one embodiment, the blockchain upload acknowledge configuration information includes one or more of: an IP address list and/or a node list of a blockchain server reported through a blockchain measurement; a blockchain measurement content including one or more of cell load information of each PLMN or a cell spectrum usage situation; a blockchain session identifier; or an identifier of a fifth communication node.

In one embodiment, an embodiment of the present application provides an information processing method by which blockchain upload configuration information is exchanged between a second communication node, a third communication node, and a first communication node in a communication system so that the first communication node can upload, to a fourth communication node, measured blockchain data stored locally and/or measured blockchain data reported by a fifth communication node, achieving trusted information storage.

The information processing method provided in the embodiment of the present application mainly includes the following.

When the second communication node initiates a blockchain upload activation process, the second communication node sends a blockchain upload activate message to the third communication node, and the third communication node carries related blockchain upload activation configuration information in the blockchain upload activate message sent to the first communication node.

Alternatively, when the second communication node initiates a blockchain upload activation process, the second communication node may directly send a related upload activate message to the first communication node, where the upload activate message carries blockchain upload activation configuration information.

The upload activation configuration information includes one or more of: an IP address list and/or a node list of a blockchain server reported through a blockchain measurement; a blockchain measurement content including one or more of cell load information of each PLMN or a cell spectrum usage situation; blockchain encryption algorithm configuration information; a measurement type including an event measurement and/or a periodic measurement; reporting configuration information based on a measurement type, where the reporting configuration information includes an event threshold and/or a period interval; a data format; block size information; a blockchain session identifier; an identifier of the fifth communication node; a correspondence relationship between server device identifiers/server addresses and measurement contents/upload information; or a user signature indication.

Both blockchain technology and DAG technology belong to DLT.

In the embodiment, the DAG technology may be used in the method as an alternative of the blockchain technology. In this case, the blockchain server becomes a DAG server.

If a blockchain upload system employs the DAG technology, IP address lists and IP address combinations of the blockchain server may correspond to DAG node combinations, respectively.

FIG. 4 is a structural diagram of a communication system according to an embodiment of the present application. As shown in FIG. 4, in the embodiment, when the blockchain technology is used, the first communication node may be a base station which may be a gNB; the second communication node is an OAM system which may also be referred to as a network management system; the third communication node is a network element of a core network, where the network element of the core network may be an AMF; and the fourth communication node is the blockchain server, and the fifth communication node is a terminal.

In the embodiment, when the DAG technology is used, the first communication node may be the base station which may be the gNB; the second communication node is the OAM system which may also be referred to as the network management system; the third communication node is the network element of the core network, where the network element of the core network may be the AMF; and the fourth communication node is the DAG server, and the fifth communication node is the terminal.

To-be-uploaded blockchain data is sent to all of IP addresses of the fourth communication node; or to-be-uploaded blockchain data is sent to part of IP addresses of the fourth communication node. Measured blockchain data, such as cell load information, may be reported to only part of the IP addresses of the blockchain server.

The blockchain upload activation configuration information sent by the third communication node to the first communication node may be implemented by one or more of the following messages: an INITIAL CONTEXT SETUP REQUEST message, a HANDOVER REQUEST message, or a TRACE START message.

Alternatively, the blockchain upload activation configuration information sent by the third communication node to the first communication node may be implemented by a new interface message constructed between the third communication node and the first communication node.

The information processing method provided in the embodiment of the present application further includes the following.

When the second communication node initiates a blockchain upload deactivation process, the second communication node sends a blockchain upload deactivate message to the third communication node, and the third communication node carries related blockchain upload deactivation configuration information in the blockchain upload deactivate message sent to the first communication node.

Alternatively, when the second communication node initiates a blockchain upload deactivation process, the second communication node may directly send a related upload deactivate message to the first communication node, where the upload deactivate message carries blockchain upload deactivation configuration information.

The upload deactivation configuration information includes one or more of the blockchain session identifier or the identifier of the fifth communication node.

The information processing method provided in the embodiment of the present application further includes the following.

When the second communication node initiates a blockchain upload suspension process, the second communication node sends a blockchain upload suspend message to the third communication node, and the third communication node carries related blockchain upload suspension configuration information in the blockchain upload suspend message sent to the first communication node.

Alternatively, when the second communication node initiates a blockchain upload suspension process, the second communication node may directly send a related upload suspend message to the first communication node, where the upload suspend message carries blockchain upload suspension configuration information.

The upload suspension configuration information includes one or more of the blockchain session identifier or the identifier of the fifth communication node.

The information processing method provided in the embodiment of the present application further includes the following.

When the second communication node initiates a blockchain upload resuming process, the second communication node sends a blockchain upload resume message to the third communication node, and the third communication node carries related blockchain upload resumption configuration information in the blockchain upload resume message sent to the first communication node.

Alternatively, when the second communication node initiates a blockchain upload resuming process, the second communication node may directly send a related upload resume message to the first communication node, where the upload resume message carries blockchain upload resumption configuration information.

The upload resumption configuration information includes one or more of the blockchain session identifier or the identifier of the fifth communication node.

The information processing method provided in the embodiment of the present application further includes the following.

When the fourth communication node initiates a blockchain upload acknowledgement process, the fourth communication node sends a blockchain upload acknowledge message to the first communication node, and the first communication node carries related blockchain upload acknowledge configuration information in the blockchain upload acknowledge message sent to the third communication node.

Alternatively, the first communication node may directly send related blockchain upload acknowledge configuration information to the second communication node. One of the following information or a combination of the following information is contained.

The upload acknowledge configuration information includes one or more of: the IP address list and/or a node list of the blockchain server reported through the blockchain measurement; the blockchain measurement content including one or more of the cell load information of each PLMN or the cell spectrum usage situation; the blockchain session identifier; or the identifier of the fifth communication node.

In one embodiment, a signaling-based blockchain upload activation process is provided. Blockchain technology is used as an example in the embodiment of the present application.

Figure 5:
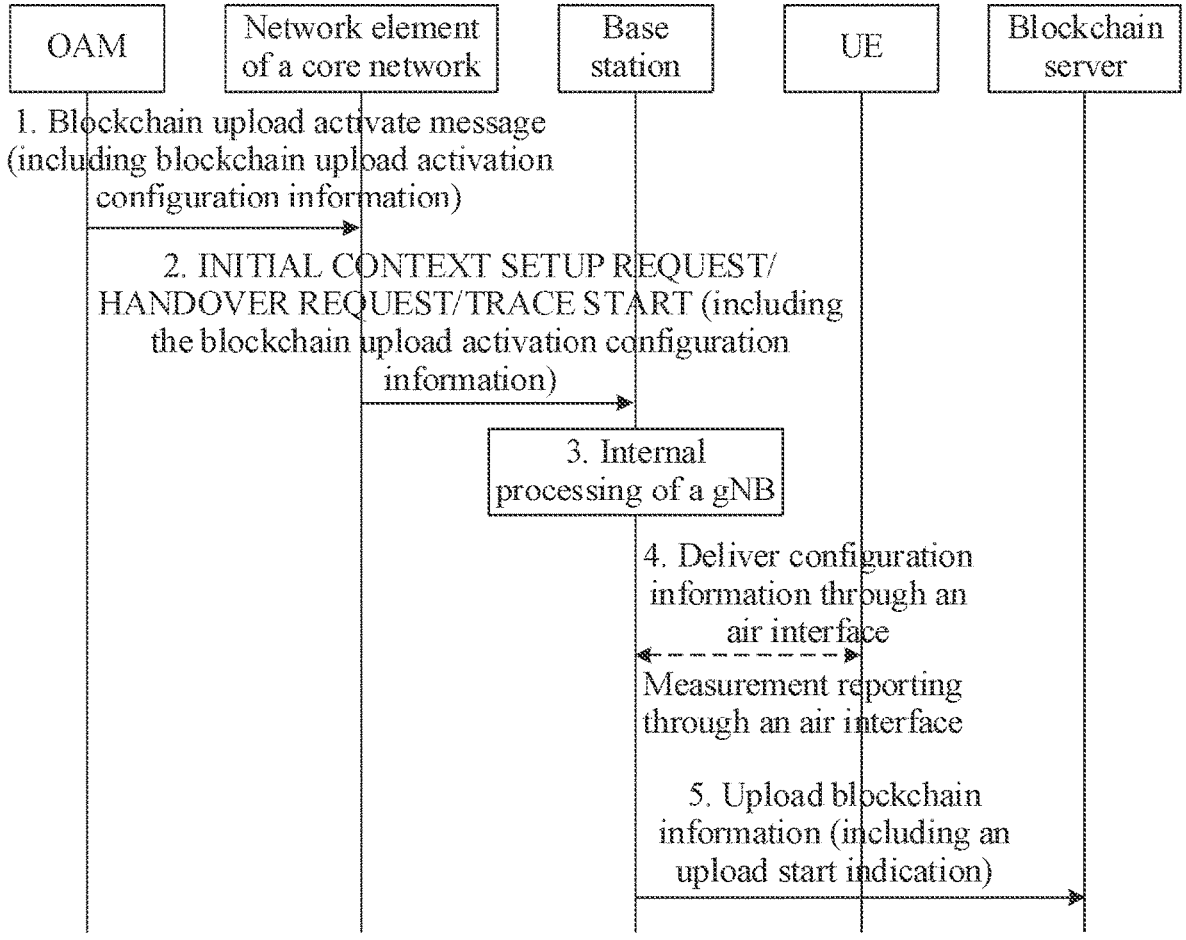
FIG. 5 is a flowchart of a signaling-based upload activation method according to an embodiment of the present application.

As shown in FIG. 5, the blockchain upload activation process provided in the embodiment of the present application mainly includes the following.

In S1, when OAM initiates the blockchain upload activation process, the OAM sends a blockchain upload activate message to a network element of a core network, where the blockchain upload activate message includes blockchain upload activation configuration information.

The upload activation configuration information includes one or more of: an IP address list and/or a node list of a blockchain server reported through a blockchain measurement; a blockchain measurement content including one or more of cell load information of each PLMN or a cell spectrum usage situation; blockchain encryption algorithm configuration information; a measurement type including an event measurement and/or a periodic measurement; reporting configuration information based on a measurement type, where the reporting configuration information includes an event threshold and/or a period interval; a data format; block size information; a blockchain session identifier; an identifier of the fifth communication node; a correspondence relationship between server device identifiers/server addresses and measurement contents/upload information; or a user signature indication.

In S2, after receiving the blockchain upload activation configuration information, the network element of the core network sends the blockchain upload activation configuration information to a base station through an interface between the core network and the base station and according to an interface process. For example, an INITIAL CONTEXT SETUP REQUEST message, a HANDOVER REQUEST message, or a TRACE START message may be used, or a new interface message constructed between the core network and the base station may be used.

In S3, after the base station receives the blockchain upload activation configuration information, the base station collects to-be-uploaded blockchain data stored locally.

In S4, the base station sends the blockchain upload activation configuration information to a corresponding UE through an air interface message, and after receiving the blockchain upload activation configuration information, the UE measures and collects to-be-uploaded blockchain data according to the upload activation configuration information and reports the measured or collected to-be-uploaded blockchain data to the base station through an air interface message. The to-be-uploaded blockchain data may be reported through a control plane or a user plane.

In S5, the base station uploads, to the blockchain server, the collected to-be-uploaded blockchain data stored locally and/or the to-be-uploaded blockchain data reported by the terminal.

In one embodiment, a signaling-based blockchain upload deactivation process is provided. Blockchain technology is used as an example in the embodiment of the present application.

Figure 6:
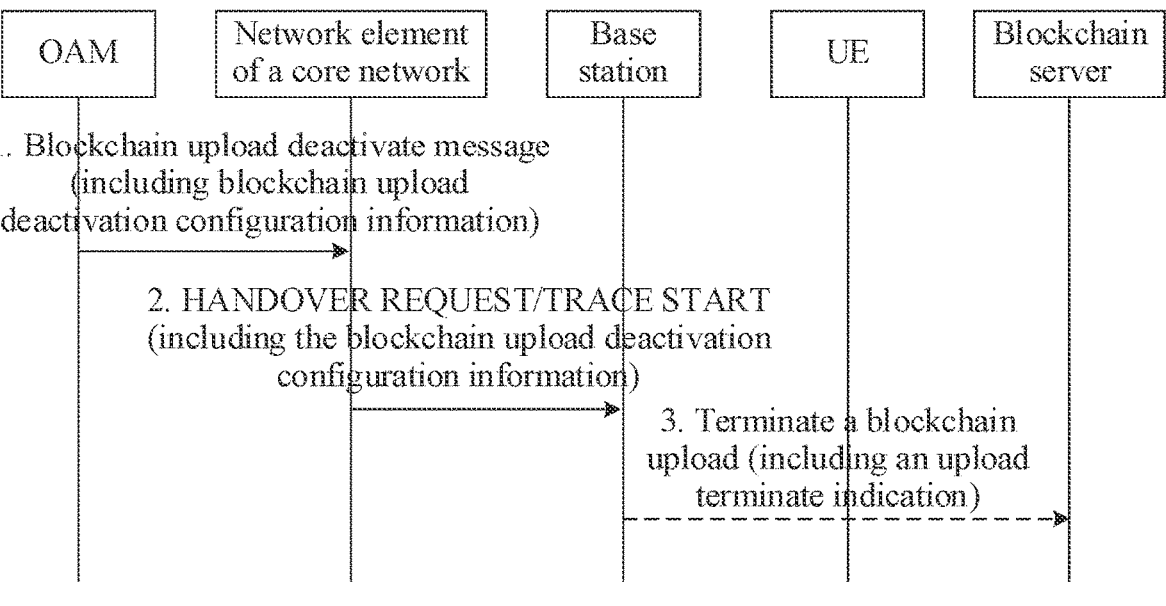
FIG. 6 is a flowchart of a signaling-based upload deactivation method according to an embodiment of the present application.

As shown in FIG. 6, the blockchain upload deactivation process provided in the embodiment of the present application mainly includes the following.

In S1, when OAM initiates the blockchain upload deactivation process, the OAM sends a blockchain upload deactivate message to a network element of a core network, where the blockchain upload deactivate message includes blockchain upload deactivation configuration information.

The upload deactivation configuration information includes one or more of a blockchain session identifier or an identifier of a terminal.

In S2, after receiving the blockchain upload deactivation configuration information, the network element of the core network sends the blockchain upload deactivation configuration information to a base station through an interface between the core network and the base station and according to an interface process. For example, a HANDOVER REQUEST message or a TRACE START message may be used, or a new interface message constructed between the core network and the base station may be used.

In S3, after receiving the blockchain upload deactivation configuration information, the base station terminates a blockchain upload.

In one embodiment, a signaling-based blockchain upload suspension process is provided. Blockchain technology is used as an example in the embodiment of the present application.

Figure 7:
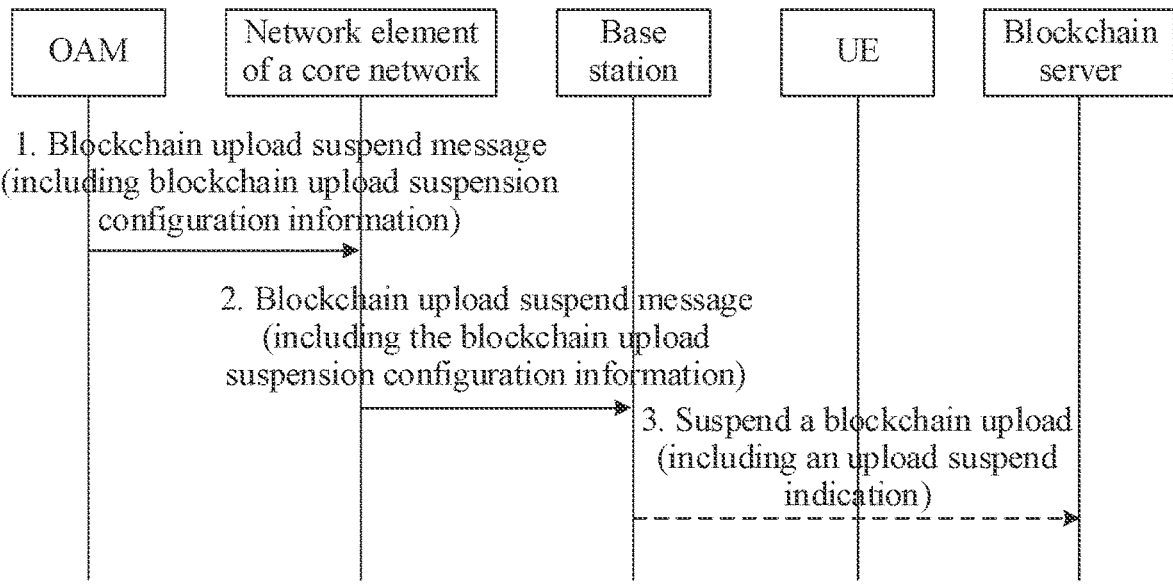
FIG. 7 is a flowchart of a signaling-based upload suspension method according to an embodiment of the present application.

As shown in FIG. 7, the blockchain upload suspension process provided in the embodiment of the present application mainly includes the following.

In S1, when OAM initiates the blockchain upload suspension process, the OAM sends a blockchain upload suspend message to a network element of a core network, where the blockchain upload suspend message includes blockchain upload suspension configuration information.

The upload suspension configuration information includes one or more of a blockchain session identifier or an identifier of a terminal.

In S2, after receiving the blockchain upload suspension configuration information, the network element of the core network sends the blockchain upload suspension configuration information to a base station through an interface between the core network and the base station and according to an interface process. For example, a multiplexing message may be used, or a new interface message constructed between the core network and the base station may be used.

In S3, after receiving the blockchain upload suspension configuration information, the base station suspends a blockchain upload.

In one embodiment, a signaling-based blockchain upload resuming process is provided. Blockchain technology is used as an example in the embodiment of the present application.

Figure 8:
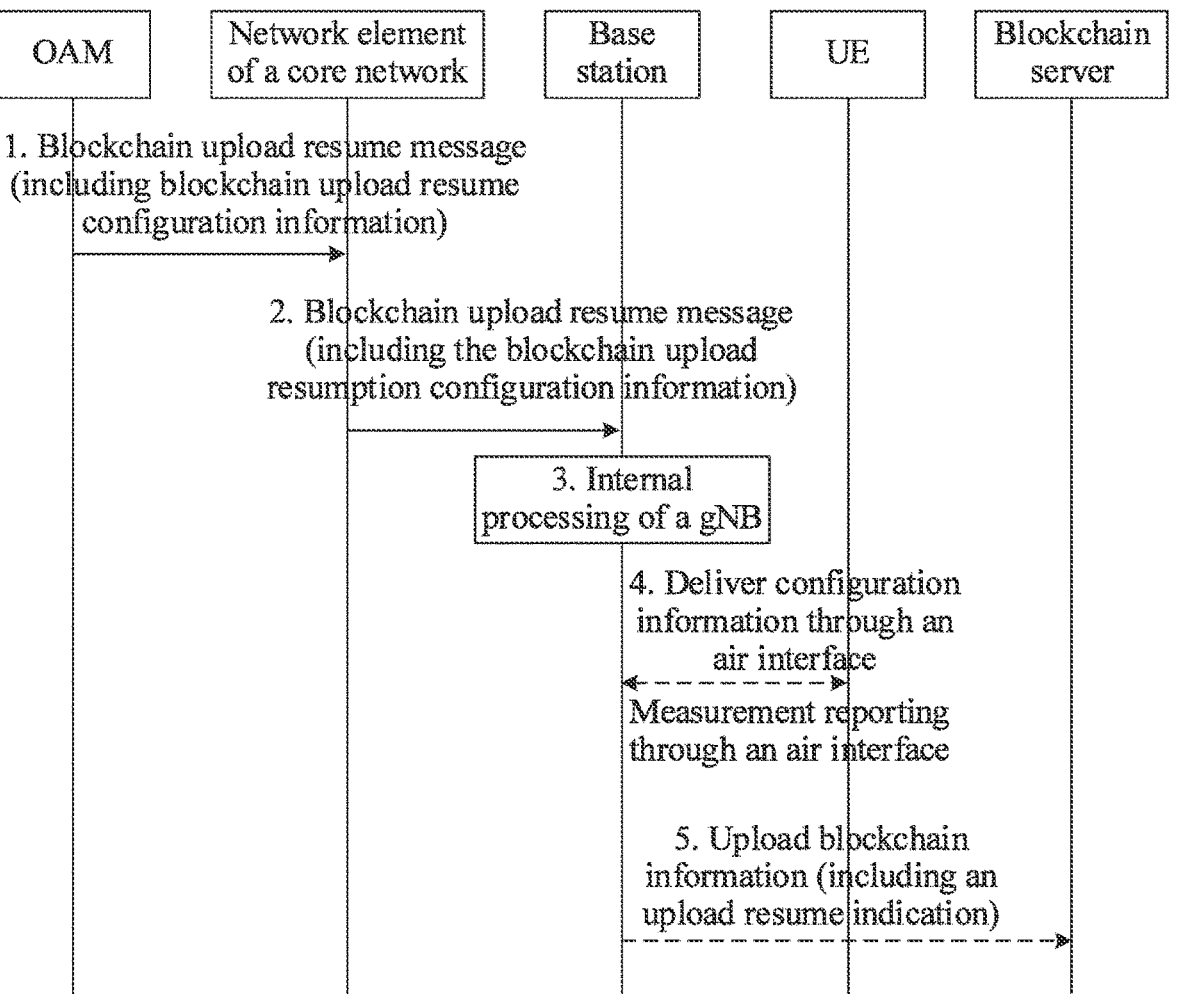
FIG. 8 is a flowchart of a signaling-based upload resuming method according to an embodiment of the present application.

As shown in FIG. 8, the blockchain upload resuming process provided in the embodiment of the present application mainly includes the following.

In S1, when OAM initiates the blockchain upload resuming process, the OAM sends a blockchain upload resume message to a network element of a core network, where the blockchain upload resume message includes blockchain upload resumption configuration information.

The upload resumption configuration information includes one or more of a blockchain session identifier or an identifier of a terminal.

In S2, after receiving the blockchain upload resumption configuration information, the network element of the core network sends the blockchain upload resumption configuration information to a base station through an interface between the core network and the base station and according to an interface process. For example, a multiplexing message may be used, or a new interface message constructed between the core network and the base station may be used.

In S3, after the base station receives the blockchain upload resumption configuration information, the base station collects to-be-uploaded blockchain data stored locally.

In S4, the base station sends the blockchain upload resumption configuration information to a corresponding UE through an air interface message, and after receiving the blockchain upload resumption configuration information, the UE measures and collects blockchain data according to the blockchain upload resumption configuration information and reports the measured and collected to-be-uploaded blockchain data to the base station through an air interface message. The to-be-uploaded blockchain data may be reported through a control plane or a user plane.

In S5, the base station uploads, to a blockchain server, the collected to-be-uploaded blockchain data stored locally and/or the to-be-uploaded blockchain data reported by the terminal.

In one embodiment, a management-based blockchain upload activation process is provided. Blockchain technology is used as an example in the embodiment of the present application.

Figure 9:
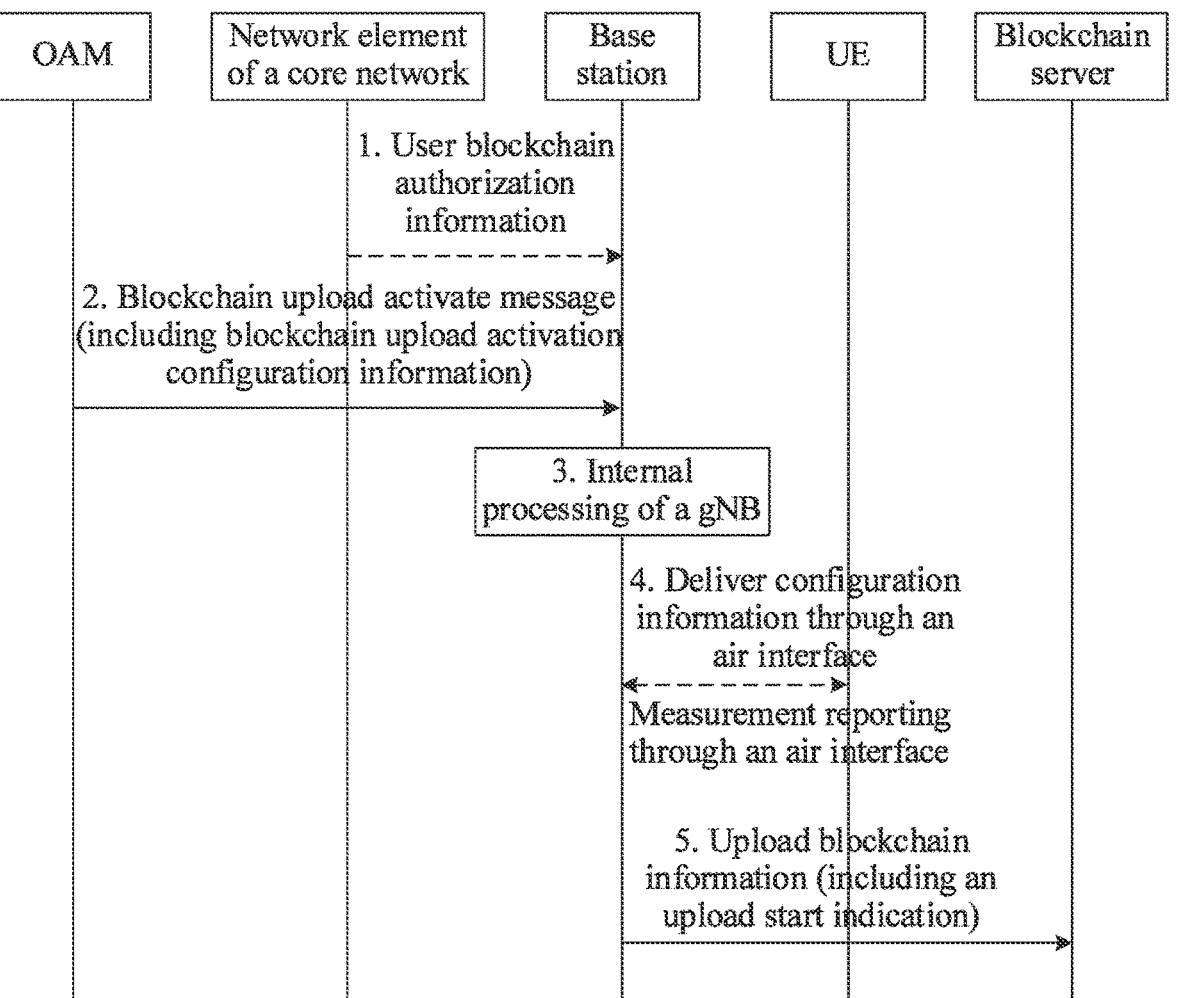
FIG. 9 is a flowchart of a management-based upload activation method according to an embodiment of the present application.

As shown in FIG. 9, the blockchain upload activation process provided in the embodiment of the present application mainly includes the following.

In S1, upon receiving user blockchain authorization information sent by a network element of a core network, a base station stores the blockchain authorization information.

In S2, when OAM initiates the blockchain upload activation process, the OAM directly sends a blockchain upload activate message to the base station, where the blockchain upload activate message includes blockchain upload activation configuration information.

The upload activation configuration information includes one or more of: an IP address list and/or a node list of a blockchain server reported through a blockchain measurement; a blockchain measurement content including one or more of cell load information of each PLMN or a cell spectrum usage situation; blockchain encryption algorithm configuration information; a measurement type including an event measurement and/or a periodic measurement; reporting configuration information based on a measurement type, where the reporting configuration information includes an event threshold and/or a period interval; a data format; block size information; a blockchain session identifier; an identifier of a terminal; a correspondence relationship between server device identifiers/server addresses and measurement contents/upload information; or a user signature indication.

In S3, after the base station receives the blockchain upload activation configuration information, the base station collects to-be-uploaded blockchain data stored locally.

In S4, the base station sends the blockchain upload activation configuration information to a corresponding UE through an air interface message, and after receiving the blockchain upload activation configuration information, the UE measures and collects to-be-uploaded blockchain data according to the upload activation configuration information and reports the measured or collected to-be-uploaded blockchain data to the base station through an air interface message. The to-be-uploaded blockchain data may be reported through a control plane or a user plane.

In S5, the base station uploads, to the blockchain server, the collected to-be-uploaded blockchain data stored locally and/or the to-be-uploaded blockchain data reported by the terminal.

In one embodiment, a management-based blockchain upload deactivation process is provided. Blockchain technology is used as an example in the embodiment of the present application.

Figures 10, 11:
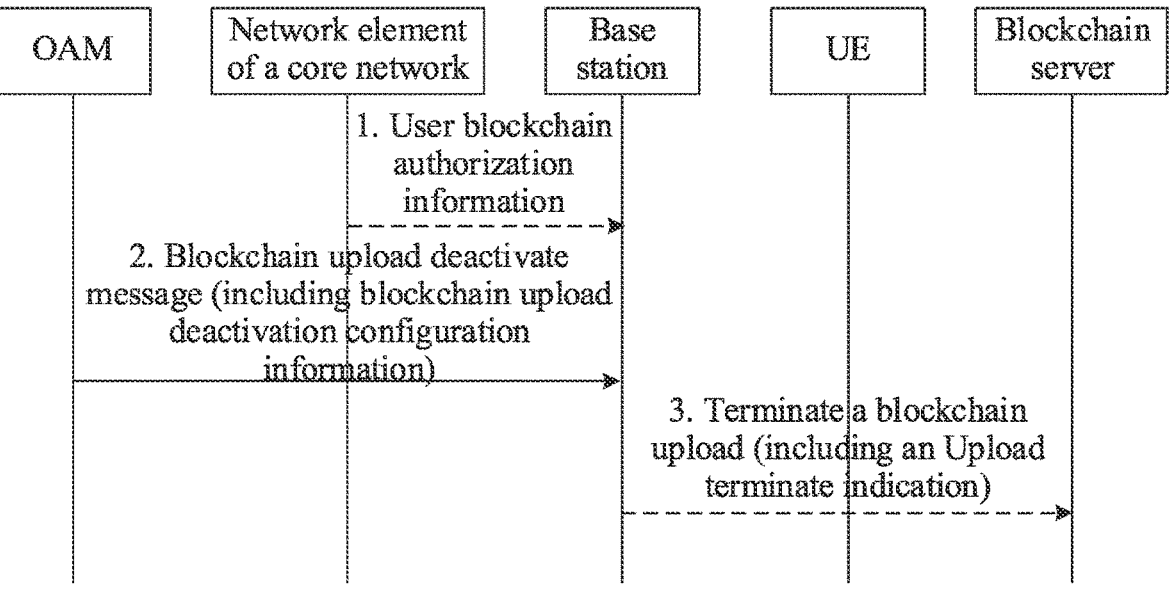
FIG. 10 is a flowchart of a management-based upload deactivation method according to an embodiment of the present application.
FIG. 11 is a flowchart of a management-based upload suspension method according to an embodiment of the present application.

As shown in FIG. 10, the blockchain upload deactivation process provided in the embodiment of the present application mainly includes the following.

In S1, upon receiving user blockchain authorization information sent by a network element of a core network, a base station stores the blockchain authorization information.

In S2, a blockchain upload deactivate message is directly sent to the base station, where the blockchain upload deactivate message includes blockchain upload deactivation configuration information.

The upload deactivation configuration information includes one or more of a blockchain session identifier or an identifier of a terminal.

In S3, after receiving the blockchain upload deactivation configuration information, the base station terminates a blockchain upload.

In one embodiment, a management-based blockchain upload suspension process is provided. Blockchain technology is used as an example in the embodiment of the present application.

As shown in FIG. 11, the blockchain upload suspension process provided in the embodiment of the present application mainly includes the following.

In S1, upon receiving user blockchain authorization information sent by a network element of a core network, a base station stores the blockchain authorization information.

In S2, when OAM initiates the blockchain upload suspension process, the OAM sends a blockchain upload suspend message to the base station, where the blockchain upload suspend message includes blockchain upload suspension configuration information.

The upload suspension configuration information includes one or more of a blockchain session identifier or an identifier of a terminal.

In S3, after receiving the blockchain upload suspension configuration information, the base station suspends a blockchain upload.

In one embodiment, a management-based blockchain upload resuming process is provided. Blockchain technology is used as an example in the embodiment of the present application.

Figure 12:
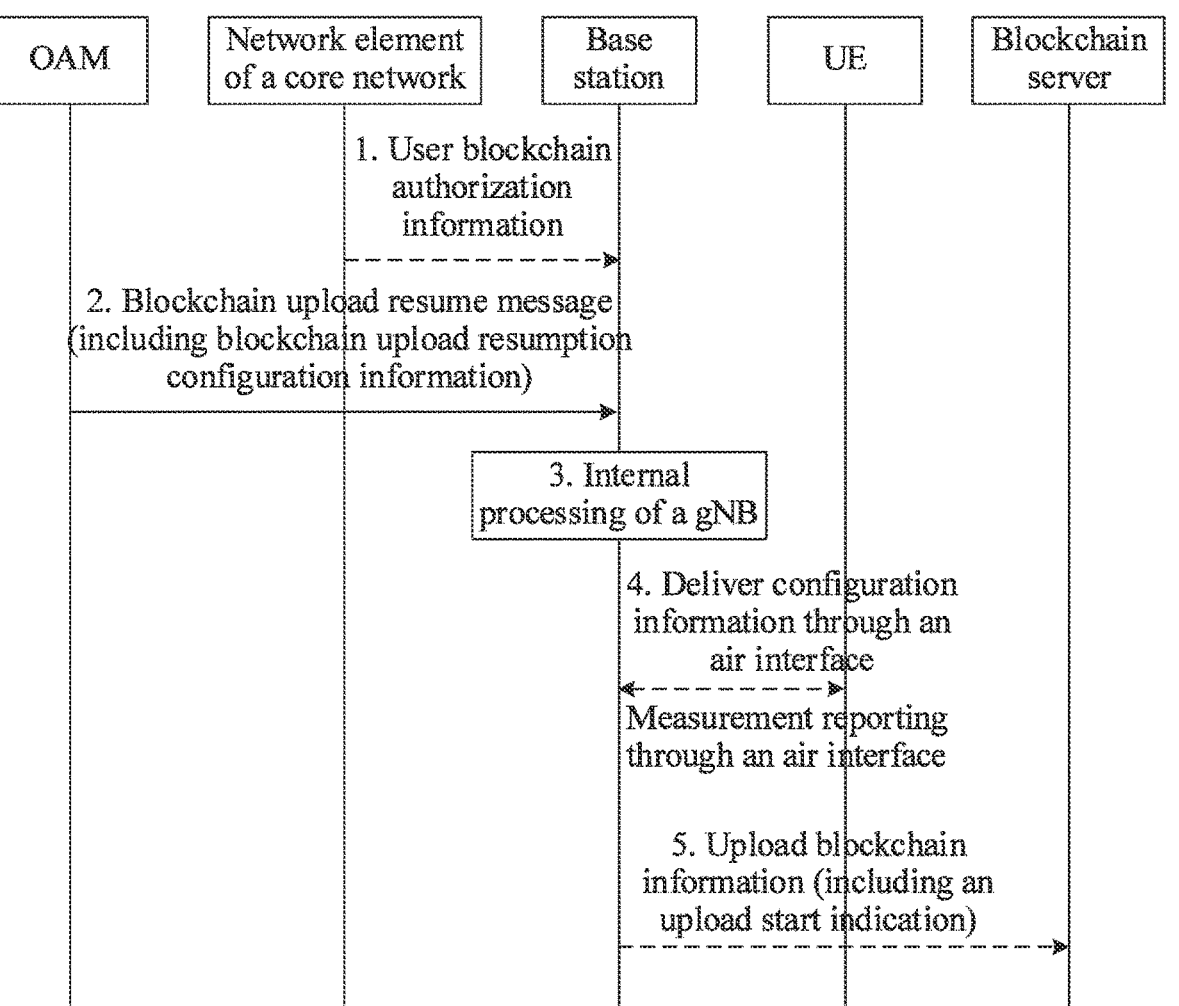
FIG. 12 is a flowchart of a management-based upload resuming method according to an embodiment of the present application.

As shown in FIG. 12, the blockchain upload resuming process provided in the embodiment of the present application mainly includes the following.

In S1, upon receiving user blockchain authorization information sent by a network element of a core network, a base station stores the blockchain authorization information.

In S2, when OAM initiates the blockchain upload resuming process, the OAM sends a blockchain upload resume message to the base station, where the blockchain upload resume message includes blockchain upload resumption configuration information.

The upload resumption configuration information includes one or more of a blockchain session identifier or an identifier of a terminal.

In S3, after the base station receives the blockchain upload resumption configuration information, the base station collects to-be-uploaded blockchain data stored locally.

In S4, the base station sends the blockchain upload resumption configuration information to a corresponding UE through an air interface message, and after receiving the blockchain upload resumption configuration information, the UE measures and collects blockchain data according to the blockchain upload resumption configuration information and reports the measured and collected to-be-uploaded blockchain data to the base station through an air interface message. The to-be-uploaded blockchain data may be reported through a control plane or a user plane.

In S5, the base station performs upload transactions, with a blockchain server, the collected to-be-uploaded blockchain data stored locally and/or the to-be-uploaded blockchain data reported by the terminal.

In one embodiment, a signaling-based blockchain upload acknowledgement process is provided. Blockchain technology is used as an example in the embodiment of the present application.

Figure 13:
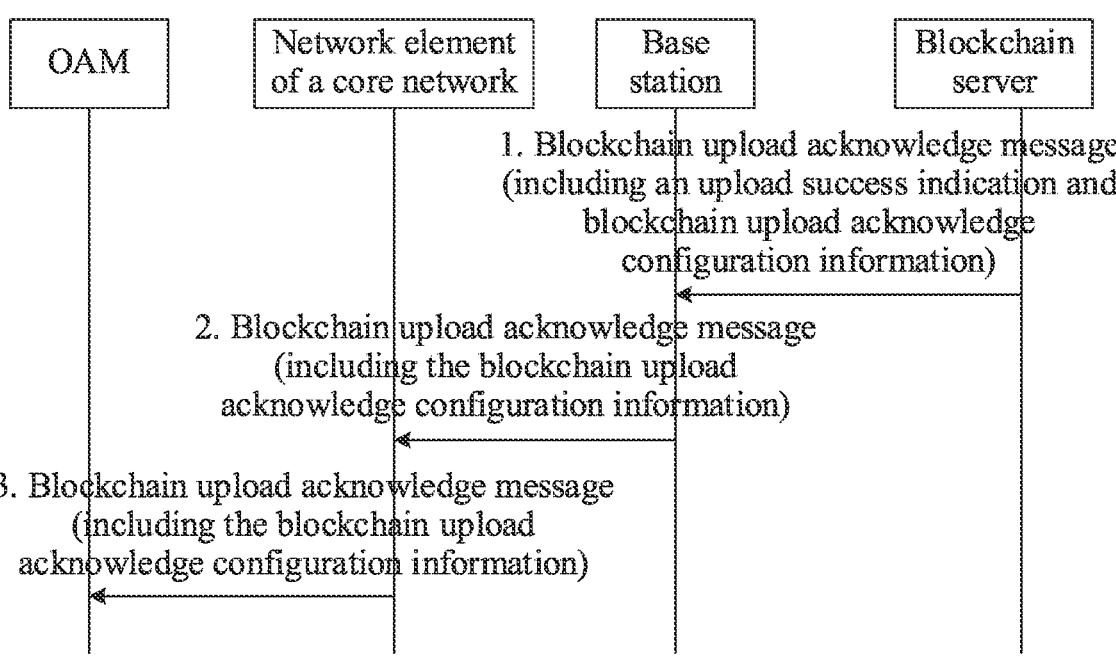
FIG. 13 is a flowchart of a signaling-based upload acknowledgement method according to an embodiment of the present application.

As shown in FIG. 13, the signaling-based blockchain upload acknowledgement process provided in the embodiment of the present application mainly includes the following.

In S1, a blockchain server initiates the blockchain upload acknowledgement process and sends a blockchain upload acknowledge message to a base station, where the blockchain upload acknowledge message includes a blockchain upload success indication and blockchain upload acknowledge configuration information.

The blockchain upload acknowledge configuration information includes one or more of: an IP address list and/or a node list of the blockchain server reported through a blockchain measurement; a blockchain measurement content including one or more of cell load information of each PLMN or a cell spectrum usage situation; a blockchain session identifier; or an identifier of a fifth communication node.

In S2, after receiving the blockchain upload acknowledge message, the base station sends the blockchain upload acknowledge configuration information to a network element of a core network through an interface between the base station and the core network and according to an interface process. For example, a multiplexing message may be used, or a new interface message constructed between the base station and the core network may be used.

In S3, after receiving the blockchain upload acknowledge configuration information, the core network sends the blockchain upload acknowledge configuration information to OAM.

In one embodiment, a management-based blockchain upload acknowledgement process is provided. Blockchain technology is used as an example in the embodiment of the present application.

Figure 14:
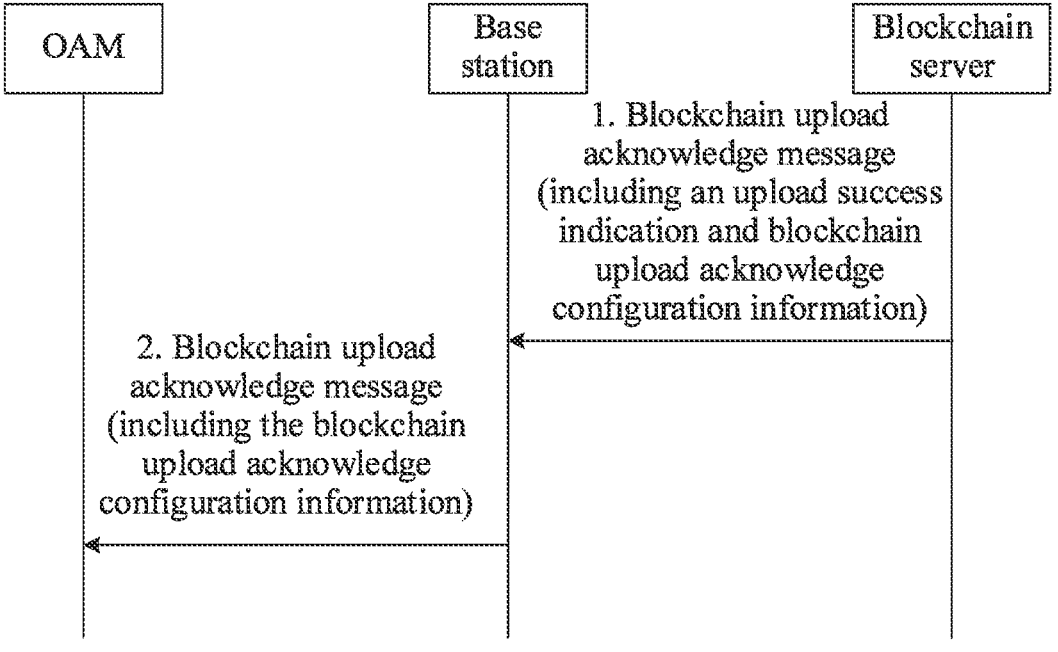
FIG. 14 is a flowchart of a management-based upload acknowledgement method according to an embodiment of the present application.

As shown in FIG. 14, the management-based blockchain upload acknowledgement process provided in the embodiment of the present application mainly includes the following.

In S1, a blockchain server initiates the blockchain upload acknowledgement process and sends a blockchain upload acknowledge message to a base station, where the blockchain upload acknowledge message includes a blockchain upload success indication and blockchain upload acknowledge configuration information.

The blockchain upload acknowledge configuration information includes one or more of: an IP address list and/or a node list of the blockchain server reported through a blockchain measurement; a blockchain measurement content including one or more of cell load information of each PLMN or a cell spectrum usage situation; a blockchain session identifier; or an identifier of a fifth communication node.

In S2, after receiving the blockchain upload acknowledge message, the base station sends the blockchain upload acknowledge configuration information to OAM.

In one embodiment, an embodiment of the present application provides an information processing apparatus which may be implemented by software and/or hardware. The information processing apparatus is configured in a first communication node.

Figure 15:
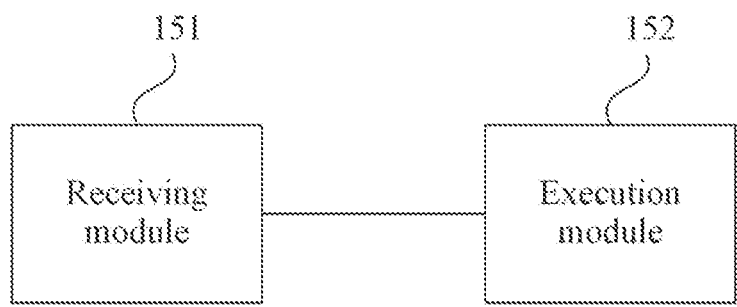
FIG. 15 is a schematic diagram of an information processing apparatus according to an embodiment of the present application.

As shown in FIG. 15, the information processing apparatus provided in the embodiment of the present application mainly includes a receiving module 151 and an execution module 152.

The receiving module 151 is configured to receive an upload-related message sent by a second communication node, where the upload-related message carries upload configuration information. The execution module 152 is configured to perform an upload-related operation based on the upload configuration information.

Receiving the upload configuration information sent by the second communication node includes the following.

In one embodiment, the upload-related message directly sent by the second communication node is received; and/or the upload-related message sent by a third communication node is received, where the upload-related message is sent by the second communication node to the third communication node.

In one embodiment, the upload configuration information includes one or more of upload activation configuration information, upload deactivation configuration information, upload suspension configuration information, or upload resumption configuration information.

In one embodiment, the upload activation configuration information includes one or more of: an IP address list and/or a node list of a blockchain server reported through a blockchain measurement; a blockchain measurement content including one or more of cell load information of each PLMN or a cell spectrum usage situation; blockchain encryption algorithm configuration information; a measurement type including an event measurement and/or a periodic measurement; reporting configuration information based on a measurement type, where the reporting configuration information includes an event threshold and/or a period interval; a data format; block size information; a blockchain session identifier; an identifier of a fifth communication node; a correspondence relationship between server device identifiers/server addresses and measurement contents/upload information; or a user signature indication.

In one embodiment, the upload deactivation configuration information, the upload suspension configuration information, and the upload resumption configuration information each include one or more of: the blockchain session identifier or the identifier of the fifth communication node.

In one embodiment, in the case where the upload configuration information is the upload activation configuration information or the upload configuration information is the upload resumption configuration information, performing the upload-related operation based on the upload configuration information includes the following.

To-be-uploaded blockchain data is determined based on the upload configuration information and sent to a fourth communication node.

In one embodiment, determining the to-be-uploaded blockchain data based on the upload configuration information includes the following.

The to-be-uploaded blockchain data stored locally is collected based on the upload configuration information. Additionally/alternatively, an air interface message is sent to the fifth communication node and the to-be-uploaded blockchain data sent by the fifth communication node is received, where the air interface message carries the upload configuration information for instructing the fifth communication node to measure and collect the to-be-uploaded blockchain data and send the to-be-uploaded blockchain data to the first communication node.

In one embodiment, sending the to-be-uploaded blockchain data to the fourth communication node includes the following.

The to-be-uploaded blockchain data is sent to all of IP addresses of the fourth communication node; or the to-be-uploaded blockchain data is sent to part of IP addresses of the fourth communication node.

In one embodiment, in the case where the upload configuration information is the upload deactivation configuration information, performing the upload-related operation based on the upload configuration information includes the following.

A blockchain upload is terminated based on the upload deactivation configuration information.

In one embodiment, in the case where the upload configuration information is the upload suspension configuration information, performing the upload-related operation based on the upload configuration information includes the following.

A blockchain upload is suspended based on the upload suspension configuration information.

In one embodiment, before the upload-related message sent by the second communication node is received, the method further includes the following.

If blockchain authorization information sent by the third communication node is received, the blockchain authorization information is stored.

In one embodiment, after the upload-related operation is performed based on the upload configuration information, the method further includes the following.

An upload acknowledge message sent by the fourth communication node is received, where the upload acknowledge message includes a blockchain upload success indication message and/or blockchain upload acknowledge configuration information. The blockchain upload acknowledge configuration information is sent to the second communication node.

In one embodiment, the blockchain upload acknowledge configuration information includes one or more of: the IP address list and/or a node list of the blockchain server reported through the blockchain measurement; the blockchain measurement content including one or more of the cell load information of each PLMN or the cell spectrum usage situation; the blockchain session identifier; or the identifier of the fifth communication node.

In one embodiment, sending the blockchain upload acknowledge configuration information to the second communication node includes the following.

The blockchain upload acknowledge configuration information is directly sent to the second communication node. Additionally/alternatively, the blockchain upload acknowledge configuration information is sent to the third communication node, where the third communication node sends the blockchain upload acknowledge configuration information to the second communication node.

In one embodiment, an embodiment of the present application provides an information processing apparatus which may be implemented by software and/or hardware. The information processing apparatus is configured in a second communication node.

Figure 16:
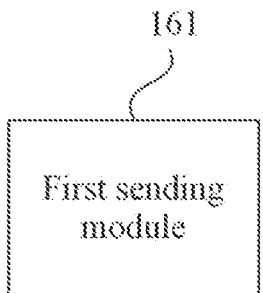
FIG. 16 is a schematic diagram of an information processing apparatus according to an embodiment of the present application.

As shown in FIG. 16, the information processing apparatus provided in the embodiment of the present application mainly includes a first sending module 161.

The first sending module 161 is configured to, in response to initiating an upload-related process, send an upload-related message to a first communication node, where the upload-related message carries upload configuration information for instructing the first communication node to perform an upload-related operation.

In one embodiment, sending the upload-related message to the first communication node includes the following.

The upload-related message is directly sent to the first communication node. Additionally/alternatively, the upload-related message is sent to a third communication node, where the third communication node sends the upload-related message to the first communication node.

In one embodiment, an embodiment of the present application provides an information processing apparatus which may be implemented by software and/or hardware. The information processing apparatus is configured in a fourth communication node.

Figure 17:
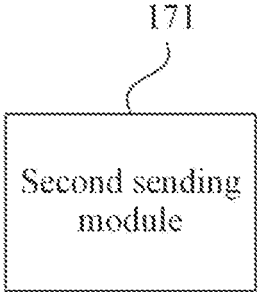
FIG. 17 is a schematic diagram of an information processing apparatus according to an embodiment of the present application.

As shown in FIG. 17, the information processing apparatus provided in the embodiment of the present application mainly includes a second sending module 171.

The second sending module 171 is configured to, in response to initiating an upload acknowledgement process, send an upload acknowledge message to a first communication node such that the first communication node sends blockchain upload acknowledge configuration information to a second communication node, where the upload acknowledge message includes a blockchain upload success indication message and/or the blockchain upload acknowledge configuration information.

In one embodiment, that the first communication node sends the blockchain upload acknowledge configuration information to the second communication node includes the following.

The first communication node directly sends the blockchain upload acknowledge configuration information to the second communication node. Additionally/alternatively, the first communication node sends the blockchain upload acknowledge configuration information to a third communication node, where the third communication node sends the blockchain upload acknowledge configuration information to the second communication node.

The information processing apparatus provided in the embodiment may perform the information processing method provided in any embodiment of the present application and has function modules and effects corresponding to the performed method. For technical details not described in detail in the embodiment, reference may be made to the information processing method provided in any embodiment of the present application.

Units and modules included in the embodiment of the information processing apparatus are just divided according to functional logic, but the present application is not limited to this division as long as the corresponding functions can be implemented. Additionally, the names of function units are just used to distinguish between each other and are not intended to limit the scope of the present application.

Figure 18:
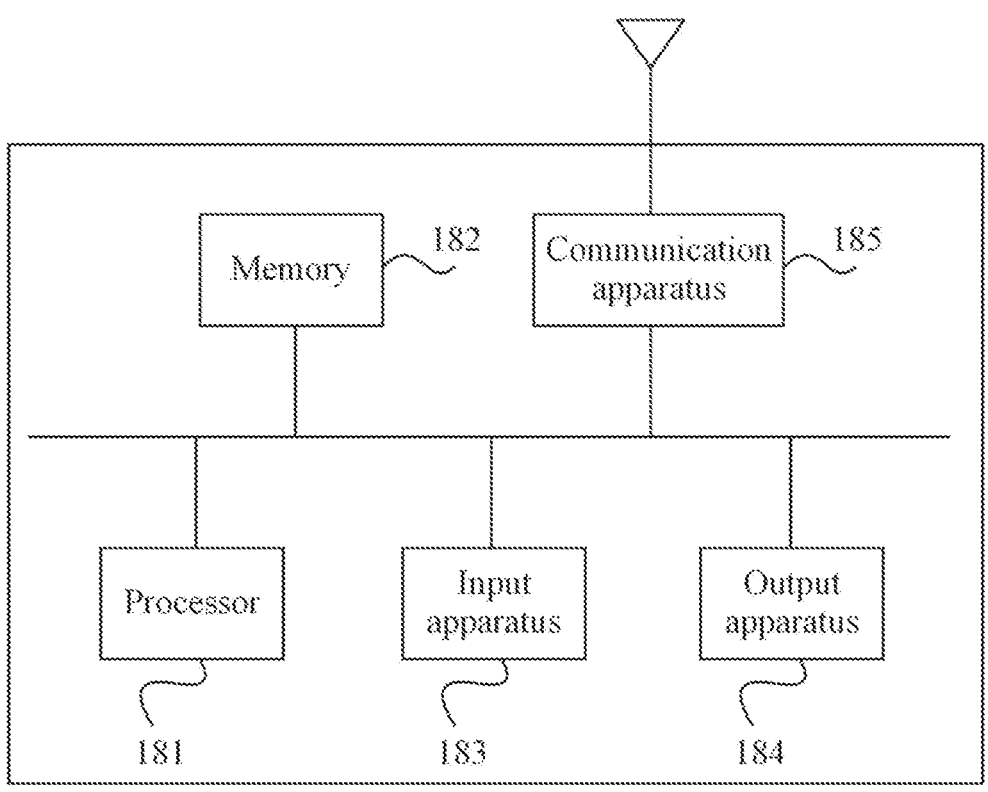
FIG. 18 is a structural diagram of an information processing device according to an embodiment of the present application.

An embodiment of the present application further provides a device. FIG. 18 is a structural diagram of a device according to an embodiment of the present application. As shown in FIG. 18, the device includes a processor 181, a memory 182, an input apparatus 183, an output apparatus 184, and a communication apparatus 185. One or more processors 181 may be included in the device. One processor 181 is shown as an example in FIG. 18. The processor 181, the memory 182, the input apparatus 183, and the output apparatus 184 in the device may be connected via a bus or in other manners. The connection via a bus is shown as an example in FIG. 18.

As a computer-readable storage medium, the memory 182 may be configured to store software programs, computer-executable programs, and modules, such as program instructions/modules corresponding to the information processing method in embodiments of the present application. The processor 181 executes software programs, instructions, and modules stored in the memory 182 to perform various function applications and data processing of the device, that is, to implement any method provided by an embodiment of the present application.

The memory 182 may mainly include a program storage region and a data storage region. The program storage region may store an operating system and an application program required by at least one function. The data storage region may store data created according to the use of the device. Additionally, the memory 182 may include a high-speed random-access memory and may also include a nonvolatile memory, such as at least one magnetic disk memory, a flash memory, or another nonvolatile solid-state memory. In some examples, the memory 182 may include memories which are remotely disposed relative to the processor 181, and these remote memories may be connected to the device via a network. Examples of the preceding network include, but are not limited to, the Internet, an intranet, a local area network, a mobile communication network, and a combination thereof.

The input apparatus 183 may be configured to receive inputted digital or character information and generate key signal input related to the user setting and function control of the device. The output apparatus 184 may include a display device such as a display screen.

The communication apparatus 185 may include a receiver and a sender. The communication apparatus 185 is configured to perform information transceiving communication under the control of the processor 181.

In an example embodiment, an embodiment of the present application further provides a storage medium including a computer-executable instruction. When the computer-executable instruction is executed by a computer processor, the computer processor performs an information processing method applied by a first communication node. The method includes the following.

An upload-related message sent by a second communication node is received, where the upload-related message carries upload configuration information. An upload-related operation is performed based on the upload configuration information.

As for the storage medium including the computer-executable instruction, which is provided in the embodiment of the present application, the computer-executable instruction may implement not only the operations in the preceding method but also the related operations in the information processing method provided in any embodiment of the present application.

In an example embodiment, an embodiment of the present application further provides a storage medium including a computer-executable instruction. When the computer-executable instruction is executed by a computer processor, the computer processor performs an information processing method applied by a second communication node. The method includes the following.

In response to initiating an upload-related process, an upload-related message is sent to a first communication node, where the upload-related message carries upload configuration information for instructing the first communication tion node to perform an upload-related operation.

As for the storage medium including the computer-executable instruction, which is provided in the embodiment of the present application, the computer-executable instruction may implement not only the operation in the preceding method but also the related operations in the information processing method provided in any embodiment of the present application.

In an example embodiment, an embodiment of the present application further provides a storage medium including a computer-executable instruction. When the computer-executable instruction is executed by a computer processor, the computer processor performs an information processing method applied by a fourth communication node. The method includes the following.

In response to initiating an upload acknowledgement process, an upload acknowledge message is sent to a first communication node such that the first communication node sends blockchain upload acknowledge configuration information to a second communication node, where the upload acknowledge message includes a blockchain upload success indication message and/or the blockchain upload acknowledge configuration information.

As for the storage medium including the computer-executable instruction, which is provided in the embodiment of the present application, the computer-executable instruction may implement not only the operation in the preceding method but also the related operations in the information processing method provided in any embodiment of the present application.

From the preceding description of embodiments, it is apparent to those skilled in the art that the present application may be implemented by software plus necessary general-purpose hardware or may be implemented by hardware. The technical solutions of the present application may be substantially embodied in the form of a software product. The software product in a computer may be stored in a computer-readable storage medium such as a floppy disk, a read-only memory (ROM), a random-access memory (RAM), a flash memory, a hard disk, or an optical disk in the computer and includes instructions for enabling a computer device (which may be a personal computer, a server, or a network device) to perform the method in the embodiments of the present application.

The above are only example embodiments of the present application.

It is to be understood by those skilled in the art that the term "user equipment" covers any suitable type of wireless user equipment, for example, a mobile phone, a portable data processing device, a portable web browser, or a vehicle-mounted mobile station.

Generally speaking, various embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing device, though the present application is not limited thereto.

Embodiments of the present application may be implemented through the execution of computer program instructions by a data processor of a mobile device, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented using any suitable data storage technology, such as, but not limited to, a ROM, a RAM, and an optical memory device and system (a digital video disc (DVD) or a compact disc (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An information processing method, the method being applied by a first communication node and comprising:
   receiving an upload-related message sent by a second communication node, wherein the upload-related message carries upload configuration information; and
   performing an upload-related operation based on the upload configuration information;
   wherein the upload configuration information comprises at least one of: upload activation configuration information, upload deactivation configuration information, upload suspension configuration information, or upload resumption configuration information;
   wherein each of the upload deactivation configuration information, the upload suspension configuration information, and the upload resumption configuration information comprises at least one of a blockchain session identifier or an identifier of a fifth communication node.

2. The method of claim 1, wherein receiving the upload-related message sent by the second communication node comprises at least one of:
   receiving the upload-related message directly sent by the second communication node; or
   receiving the upload-related message sent by a third communication node, wherein the upload-related message is sent by the second communication node to the third communication node.

3. The method of claim 1, wherein the upload activation configuration information comprises at least one of:

at least one of an Internet Protocol (IP) address list or a node list of a blockchain server reported through a blockchain measurement;

a blockchain measurement content comprising at least one of cell load information of each public land mobile network (PLMN) or a cell spectrum usage situation;

blockchain encryption algorithm configuration information;

a measurement type comprising at least one of an event measurement or a periodic measurement;

reporting configuration information based on a measurement type, wherein the reporting configuration information comprises at least one of an event threshold or a period interval;

a data format;

block size information;

a blockchain session identifier;

an identifier of a fifth communication node;

a correspondence relationship between server device identifiers/server addresses and measurement contents/upload information; or a user signature indication.

4. The method of claim 1, wherein in a case where the upload configuration information is the upload activation configuration information or the upload configuration information is the upload resumption configuration information, performing the upload-related operation based on the upload configuration information comprises:

determining to-be-uploaded blockchain data based on the upload configuration information; and sending the to-be-uploaded blockchain data to a fourth communication node.

5. The method of claim 4, wherein determining the to-be-uploaded blockchain data based on the upload configuration information comprises at least one of:

collecting, based on the upload configuration information, the to-be-uploaded blockchain data stored locally; or sending an air interface message to a fifth communication node and receiving the to-be-uploaded blockchain data sent by the fifth communication node, wherein the air interface message carries the upload configuration information for instructing the fifth communication node to measure and collect the to-be-uploaded blockchain data and send the to-be-uploaded blockchain data to the first communication node.

6. The method of claim 4, wherein sending the to-be-uploaded blockchain data to the fourth communication node comprises:

sending the to-be-uploaded blockchain data to all of IP addresses of the fourth communication node; or sending the to-be-uploaded blockchain data to part of IP addresses of the fourth communication node.

7. The method of claim 1, wherein in a case where the upload configuration information is the upload deactivation configuration information, performing the upload-related operation based on the upload configuration information comprises:

terminating a blockchain upload based on the upload deactivation configuration information.

8. The method of claim 1, wherein in a case where the upload configuration information is the upload suspension configuration information, performing the upload-related operation based on the upload configuration information comprises:

suspending a blockchain upload based on the upload suspension configuration information.

9. The method of claim 1, before receiving the upload-related message sent by the second communication node, further comprising:

in response to receiving blockchain authorization information sent by a third communication node, storing the blockchain authorization information.

10. The method of claim 1, after performing the upload-related operation based on the upload configuration information, further comprising:

receiving an upload acknowledge message sent by a fourth communication node, wherein the upload acknowledge message comprises at least one of a blockchain upload success indication message or blockchain upload acknowledge configuration information; and sending the blockchain upload acknowledge configuration information to the second communication node.

11. The method of claim 10, wherein the blockchain upload acknowledge configuration information comprises at least one of:

at least one of an IP address list or a node list of a blockchain server reported through a blockchain measurement;

a blockchain measurement content comprising at least one of cell load information of each PLMN or a cell spectrum usage situation;

a blockchain session identifier; or an identifier of a fifth communication node.

12. The method of claim 10, wherein sending the blockchain upload acknowledge configuration information to the second communication node comprises at least one of:

directly sending the blockchain upload acknowledge configuration information to the second communication node; or sending the blockchain upload acknowledge configuration information to a third communication node, wherein the third communication node sends the blockchain upload acknowledge configuration information to the second communication node.

13. An information processing device, comprising:

at least one processor; and a memory, which is configured to store at least one program;

wherein the at least one program, when executed by the at least one processor, causes the at least one processor to perform the information processing method of claim 1.

14. A non-transitory storage medium, which is configured to store a computer program, wherein the computer program, when executed by a processor, causes the processor to perform the information processing method of claim 1.

15. An information processing method, the method being applied by a second communication node and comprising:

in response to initiating an upload-related process, sending an upload-related message to a first communication node, wherein the upload-related message carries upload configuration information for instructing the first communication node to perform an upload-related operation;

wherein the upload configuration information comprises at least one of: upload activation configuration information, upload deactivation configuration information, upload suspension configuration information, or upload resumption configuration information;

wherein each of the upload deactivation configuration information, the upload suspension configuration information, and the upload resumption configuration information comprises at least one of a blockchain session identifier or an identifier of a fifth communication node.

16. The method of claim 15, wherein sending the upload-related message to the first communication node comprises at least one of:

directly sending the upload-related message to the first communication node; or sending the upload-related message to a third communication node, wherein the third communication node sends the upload-related message to the first communication node.

17. An information processing method, the method being applied by a fourth communication node and comprising:

in response to initiating an upload acknowledgement process, sending an upload acknowledge message to a first communication node such that the first communication node sends blockchain upload acknowledge configuration information to a second communication node, wherein the upload acknowledge message comprises at least one of a blockchain upload success indication message or the blockchain upload acknowledge configuration information;

wherein the blockchain upload acknowledge configuration information comprises at least one of a blockchain session identifier or an identifier of a fifth communication node.

18. The method of claim 17, wherein sending, by the first communication node, the blockchain upload acknowledge configuration information to the second communication node comprises at least one of:

directly sending, by the first communication node, the blockchain upload acknowledge configuration information to the second communication node; or sending, by the first communication node, the blockchain upload acknowledge configuration information to a third communication node, wherein the third communication node sends the blockchain upload acknowledge configuration information to the second communication node.

* * * * *